United States Patent Office 3,515,567
Patented June 2, 1970

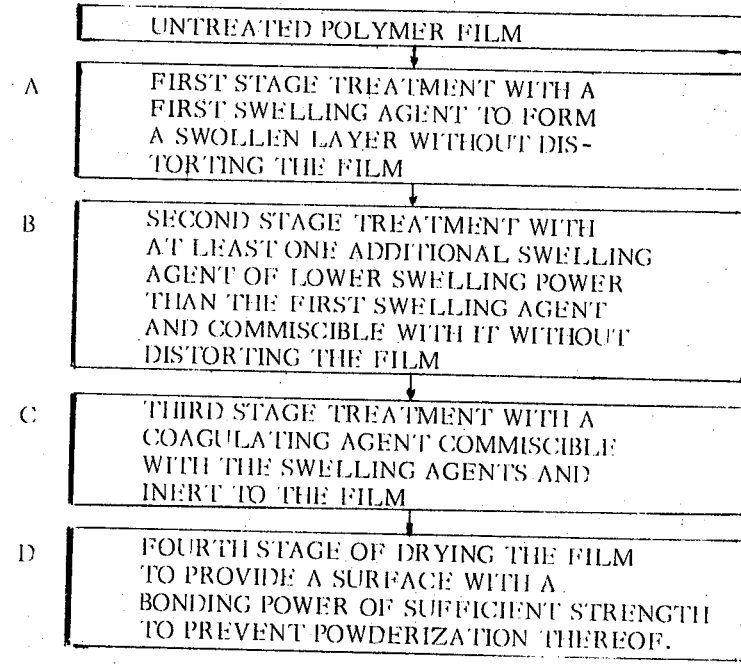

3,515,567
METHOD OF SURFACE TREATING POLYMER FILM TO PRODUCE PAPER-LIKE ARTICLE
Kaneyasu Tani, 113 2-chome, Nozawa-cho,, Getagaya-ku, Tokyo, Japan; Bunkichi Yamada, 2–6 3-chome, Shinden, Adachi-ku, Tokyo, Japan; Shozo Imoto, 2380 5-chome, Kami Meguro, Meguro-ku, Tokyo, Japan; Shiro Kawazoe, 5–2 1-chome, Ohji Honcho, Kita-ku, Tokyo, Japan; Wachio Ichihara, 680 Oaza Gohdo, Kawaguchi-shi, Saitama-ken, Kawaguchi-shi, Japan; Tatsuhiko Nagai, 22–15 1 - chome, Taira - machi, Meguro - ku, Tokyo, Japan; and Hiroaki Noguchi, 4–22 3-chome, Kashiwaza, Ageo-shi, Saitama-ken, Japan
Continuation-in-part of application Ser. No. 596,083, Nov. 22, 1966. This application Jan. 20, 1967, Ser. No. 610,481
Claims priority, application Japan, Jan. 26, 1966, 41/4,092; Feb. 4, 1966, 41/6,126; Feb. 21, 1966, 41/10,092; Feb. 23, 1966, 41/10,512; Mar. 3, 1966, 41/12,573; Apr. 4, 1966, 41/20,692; May 14, 1966, 41/30,549; June 20, 1966, 41/57,719; June 24, 1966, 41/40,704; July 5, 1966, 41/63,865; Aug. 24, 1966, 41/55,206; Aug. 26, 1966, 41/55,806; Oct. 22, 1966, 41/69,274, 41/69,275, 41/69,276, 41/69,277, 41/69,278
Int. Cl. B41m 5/14; D21h 5/00
U.S. Cl. 117—11                18 Claims

ABSTRACT OF THE DISCLOSURE

A method of manufacturing a paper-like article from a polymer film, comprising the steps of:

(A) a first stage of treating a surface of the film with a swelling agent, thereby forming a swollen layer without distorting the film;
(B) a second stage of treating said swollen layer of undistorted film with at least one additional swelling agent agent of a lower swelling power than the previous swelling agent, the additional swelling agent being co-miscible with the previous swelling agent without distorting the film;
(C) a third stage of treating the swollen layer with a coagulating agent, whereby the swollen layer is coagulated, said coagulating agent being co-miscible with said swelling agents and inert to the film;
(D) a fourth stage of drying the film, whereby an opaque roughened layer is formed on the film to provide a paper-like article with a surface having a sufficient surface bonding strength so as to prevent powderization thereon.

FIELD OF THE INVENTION

A method of manufacturing a paper-like article from a polymer film.

This application is a continuation-in-part application of our copending application, Ser. No. 596,083, filed on Nov. 22, 1966, now abandoned.

This invention relates to a method of treating the surface of a polymer film thereby producing a paper-like article having various characteristics.

DESCRIPTION OF THE INVENTION

Heretofore, many attempts have been made to use polymer films as substitutes for papers in general. These attempts are mainly to treat the film so as to make it opaque, give it writability and improve its printability thereby making the film into a paper-like article. For this purpose, various methods have been proposed, such as the method adding pigments in forming the film, the embossing of the film having a rough surface after its formation, the surface coating method, the adjusting of the stretching operation, or the treating of the film surface with a solvent, etc. Of these, with respect to the method of treating the film surface with a solvent, it has been described in Japanese Pat. No. 286,372 (which corresponds to U.S. Pat. No. 3,135,622 and British Pat. No. 858,623) that a polypropylene film is treated with a solvent and a non-solvent to obtain a paper-like article, but, even if such techniques is applied to all sorts of films, the films, though they become opaque, are defective in many points, and, accordingly, from the aspect of their quality, they cannot be used as substitutes for papers in general at present.

SUMMARY OF THE INVENTION

This invention, having for its gist the treating of the surface of a polymer film with a swelling agent for said substance and successively with a non-swelling agent which is miscible with said swelling agent, relates to a method of producing a paper-like article which has various characteristics, and which can be used as a substitute for almost all sorts of papers in use at present, by combining a pre-treatment preceding to the said surface treatment, an intermediate treatment to be inserted in between the swelling agent treatment and the non-swelling agent treatment, the use of an additive at the time of treatments, and an after-treatment to be carried out subsequently to the surface treatment.

Hereunder, the mode of working of this invention is explained in detail by referring to working examples.

The polymer film materials usable in this invention include all of those which can be swollen with liquid such as polyvinyls, polyolefins, polyamides, polyesters, polyurethanes, polycarbonates, rubbers, and cellulose derivatives, and said materials may be homopolymers, blended polymers or copolymers, respectively. Also, the condition of the film, such as whether a plasticizer, stabilizer, pigment and/or antistatic agent are present or whether the film has been stretched, does not matter.

As the swelling agent in this invention, any of those which are well-known may be used, but, to aid the understanding, typical examples thereof are mentioned below, provided that, needless to say, the said swelling agent is not limited to those of the types shown herein; in order to impart an appropriate swelling power, two or more kinds of swelling agents may be mixed or they may be diluted with a non-swelling agents to be described hereinafter.

| | |
|---|---|
| Polyvinyl chloride | Tetrahydrofuran, cyclohexanone, dioxane, methylethyl ketone, etc. |
| Vinyl chloride-vinyl acetate copolymer | Do. |
| Vinyl chloride-vinylidene chloride copolymer | Do. |
| Polystyrene | Acetone, methylethyl ketone, methylbutyl ketone, carbon tetrachloride, benzene, xylene, toluene, solvent naphtha, cyclohexanone, ethyl acetate, butyl acetate, etc. |
| Polyacrylonitrile | Dimethyl sulfoxide, dimethyl formamide, etc. |
| Polymethyl metacrylate | Acetone, methylethyl ketone, benzene, xylene, etc. |
| Polyethylene | Carbon tetrachloride, benzene, toluene, xylene, etc. |
| Nylon | Phenol, cresol, etc. |
| Polyurethane | Acetone, carbon tetrachloride, ethylene dichloride, etc. |
| Polycarbonate | Acetone, benzene, xylene, ethylene dichloride, etc. |
| Rubber hydrochloride | Benzene, xylene, cyclohexanone, ethyl acetate, etc. |
| Cellulose diacetate | Ethyl acetate, acetone, methylethyl ketone, etc. |
| Cellulose triacetate | Methyl acetate, methylene dichloride, chloroform, tetrahydrofuran, etc. |
| Nitrocellulose | Ethyl acetate, acetone, etc. |

In this invention, the film surface swelling treatment is always carried out by using a liquid of the type shown above, but, in that case, it is possible to adopt a method of dipping, a method of spraying, or a method of coating by a roll, air knife or doctor knife, and, also, to treat one or both surfaces of the film. Here, in said treatment, if it progresses too much, the film will get out of shape, so the treatment is limited to the extent that the film can be kept in shape. And, conditions such as the treating temperature and time and the amount of liquid to be coated or sprayed, though differing depending upon the kind of polymer substance to be used, the thickness thereof, the kind of swelling agent, etc., may experimentally and easily be determined respectively.

Upon its surface being swollen, the film is, immediately or after being once dried to make the concentration of the swollen portion high to some extent, treated with a liquid which is a non-swelling agent for the polymer substance and which is miscible with the above said swelling agent, thereby coagulating the swollen portion.

Typical examples of such non-swelling agent are water and alcohols such as methanol, ethanol, propanol or ethylene glycol, ethers such as ethyl ether, hydrocarbons such as pentane, hexane, heptane, etc., of the typical examples shown hereinabove as swelling agents, those which have no swelling ability. An appropriate non-swelling agent may be selected from among them according to the polymer substance to be used. Also, such non-swelling agents may be mixed among them.

After being treated with a non-swelling agent, the film is dried at a temperature below the melting point of the high molecular substance. When the film with the surface swollen is treated with a non-swelling agent, the swollen portion coagulates, but, because, in that case, the swelling agent is extracted by the non-swelling agent, innumerable fine pores are formed and the area of light scattering increases, with the result that the film presents an opaque external appearance and simultaneously has a fine rough surface formed by the shrinking in volme at the time of coagulation; thus, an article similar in external appearance and in property of the surface to paper is obtained. And, the size of such fine pores and the roughness of the surface can be adjusted optionally on the basis of the combination of the swelling agent and non-swelling agent to be used, the treating conditions, or the pre-treatment, intermediate treatment or after-treatment to be described hereinafter.

The swelling agent-non-swelling agent treatment mentioned above is an indispensable treatment in this invention, but, in such treatment, it is possible to bring about excellent effects by selecting specific conditions. Of them, the first one is to use water as an indispensable component in the swelling agent or the non-swelling agent or both.

An example is given with respect to a polyvinyl chloride film. When a polyvinyl chloride film is treated with tetrahydrofuran and immediately thereafter treated with methanol to coagulate the surface swollen portion, the film comes to have high opacity and brightness, but the surface of such opacificated layer is so brittle that it, when rubbed with a finger, comes off as if powder fell off. However, if the film is treated by adding some water to tetrahydrofuran or methanol as in Example 1, an article which is superior in surface bonding strength can be obtained. This is because, by the mixing of water with alcohol, an appropriate coagulation rate is provided.

EXAMPLE 1

A non-plasticized polyvinyl chloride film of 50μ in thickness (made by Mitsubishi Monsanto Co.) was treated as in the following table at room temperature, with the result that, in all cases, a paper-like article which is superior in opacity, brightness and surface bonding strength was obtained. As control tests, the film was treated in the same way but without water, with the result that, as mentioned hereinabove, the opacity and whiteness showed satisfactory values, but the surface bonding strength lowered so strikingly, that, when the surface was rubbed with a finger, "powder falling-off" was observed.

| | Swelling Agent | | Non-Swelling Agent | |
|---|---|---|---|---|
| | Composition (part) | Treating time (second) | Composition (part) | Treating time (second) |
| Number: | | | | |
| 1 | Tetrahydrofuran (10) | 3 | Methanol (8) plus water (2) | 30 |
| 2 | do | 3 | Ethanol (7) plus water (3) | 30 |
| 3 | do | 3 | Isopropanol (7) plus water (3) | 30 |
| 4 | Tetrahydrofuran (96) plus water (4) | 4 | Methanol (10) | 30 |
| 5 | Tetrahydrofuran (94) plus water (6) | 5 | Isopropanol (7) plus water (3) | 30 |
| 6 | Cyclohexanone (8) plus methanol (1) plus water (1) | 5 | Methanol (10) | 30 |
| 7 | do | 5 | Methanol (7) plus water (3) | 30 |

Example 2 is concerned with high impact polystyrene, but the same effect is also obtained even in the case of other high molecular substance films. Incidentally, when a swelling agent with which water is not miscible is used, these must be mixed therein uniformly in advance into a multi-component mixture as shown by samples 6 and 7 in Example 1, or sample 4 in Example 2.

EXAMPLE 2

A biaxially-oriented high impact polystyrene film of 70μ in thickness (made by Mitsubishi Monsanto Co.) was treated at room temperature under the following conditions.

| | Swelling Agent | | Non-Swelling Agent | |
|---|---|---|---|---|
| | Composition (part) | Treating time (second) | Composition (part) | Treating time (second) |
| Number: | | | | |
| 1 | Tetrahydrofuran (10) | 2 | Ethanol (7) plus water (3) | 30 |
| 2 | Tetrahydrofuran (95) plus water (5) | 3 | Isopropanol (10) | 30 |
| 3 | Cyclohexanone (10) | 3 | Methanol (8) plus water (2) | 30 |
| 4 | Methylisobutyl ketone (85) plus methanol (10) plus water (5) | 7 | Methanol (10) | 30 |

In all cases, an article which is superior in surface bonding strength was obtained.

Next, a method for the production of an air-permeable film is described. As is well known, it is one of the characteristics of a polymer film that the film, as compared with paper, has little or no air permeability, and, as means to impart air permeability to such film, the mechanical perforation method and several others have been proposed. As principal of this invention states, when the surface of a polymer film is treated with a swelling agent and a non-swelling agent, fine pores are formed in the surface layer portion, but the deep layer portion which is not saturated with the swelling agent retains its original state, so the film in that condition is devoid of air permeability. However, the present inventors discovered that, if a polystryene film is treated under specific conditions, air permeability could be imparted to the film.

That is to say, when the film surface is treated by using a relatively good solvent having an mutual interaction parameter $\mu$ of less than 0.6 for polystyrene, such as benzene, toluene, solvent naphtha, carbon tetrachloride, chloroform, tetrachloroethylene, trichloroethylene, vinyl acetate monomer, ethyl acetate, monochlorobenzene, etc., and thereafter coagulated with a non-swelling agent, fine pierced pores are formed to impart air permeability to the film.

Upon being treated with a good solvent of the type mentioned above, the film is immediately swollen, and, if the swelling further progresses, the film gets out of its shape and is finally dissolved in the liquid. Accordingly, the use of a good solvent alone is improper since the film gets out of shape completely before it is treated only for a time necessary to impart air permeability. For this reason, it is necessary to use (A) a mixed solution of a good solvent with a poor solvent or non-solvent, in which the ratio of said good solvent is 39–95%, or (B) a mixed solution of the three-component system, i.e. a water-immiscible good solvent, water, and a poor solvent or non-solvent which is miscible with said good solvent and water, said solution retaining a water-in-oil type emulsified state in its composition close to the ratio in which said three dissolve one another and the ratio of said good solvent therein being 39–95%. Examples using the above said mixed solutions (A) and (B) are given below.

EXAMPLE 3

A biaxially-oriented polystyrene film of 50μ in thickness (Styrex made by Mitsubishi Jushi Co.) was dipped in a mixed solution of 67 parts of toluene and 33 parts of methanol for 5 seconds at room temperature, then dipped in methanol for 30 seconds at room temperature, and thereafter air-dried. The resulting film, when measured by a Gurley-Densometer, had an air permeability of 15 sec./100 cc., and, when writing ink was dropped to the surface, it oozed out to the back.

EXAMPLE 4

A biaxially-oriented polystyrene film of 30μ in thickness (Styrex made by Mitsubishi Jushi Co.) was dipped in an emulsified mixed solution of 70 parts of ethyl acetate, 15 parts of ethanol and 15 parts of water for 3 seconds at room temperature, then dipped in methanol for 30 seconds at room temperature, and thereafter air-dried. The resulting film, when measured by a Gurley-Densometer, had an air permeability of 100 sec./100 cc., and, when writing ink was dropped to the surface, it oozed out to the back.

Pretreatment

As stated above, if specific conditions are adopted in the main swelling agent-non-swelling agent treatment, excellent effects can be obtained. However, it is possible to bring about more excellent effects or variety of the resulting films by jointly employing a pre-treatment preceding to the said main treatment, an intermediate treatment to be inserted in between the swelling agent treatment and the non-swelling agent treatment, the use of an additive in treatment, and an after-treatment subsequent to the main treatment. These are explained hereunder.

A pre-treatment preceding to the main swelling agent-non-swelling agent treatment which is made the gist of this invention may be carried out in the following way. A blended polymer film comprising 90–50% of polyethylene and 10–50% of a different kind of polymer substance other than polyethylene is first prepared by an ordinary film molding method, then treated with a liquid which is a swelling agent for the polyethylene and which has the dissolving action for the added different kind of polymer substance, and, after extraction of a part of said polymer, further treated with a non-swelling agent to obtain a paper-like article which has pearl-like luster and which is superior in printability As swelling agents preferable for this purpose, mention may be made of tetrahydrofuran, benzene, carbon tetrachloride, toluene, etc. And, for selectively extracting and removing the different kind of polymer in the blended polymer film with polyethylene as the main constituent by using such liquid swelling agent, it suffices only to dip said film in said liquid swelling agent. In that case, the dipping time sufficient to achieve the object is less than several minutes, although it depends upon the composition of the blended polymer and the treating temperature. In short, for obtaining the desirable pearl-like luster, it suffices to extract ¼–¾ of the different kind of polymer substance contained in the film. After the extraction treatment, the film is dipped in a liquid non-swelling agent thereby coagulated and thereafter dried to obtain a film with polyethylene as the main constituent which has beautiful pearl-like luster and which, with the surface roughened, is superior in printing adaptability. Definite examples are as given below.

EXAMPLE 5

A blended polymer of 70 parts of low-density polyethylene (Sumikathene 702, a product of Sumitomo Kagaku Kogyo Co.) and 30 parts of polystyrene (Styron 666, a product of Asahi Dow Co.) was fed into a screw extruder having a diameter of 40 mm. to form a film of 0.1 mm. in thickness. The film was dipped in a benzene bath kept at 50° C. for 2 minutes, then dipped in a methanol bath kept at room temperature for 30 seconds, and thereafter air-dried.

The film obtained was opaque, had pearl-like luster and was easy to print on the surface thereof, the ink adhesion being good.

EXAMPLE 6

A composition prepared by blending 70 parts of low-density polyethylene (Mirason, a product of Mitsui Kagak Kogyo Co.), 30 parts of a vinyl chloride-vinyl acetate copolymer (Vinychlon MRS, a product of Mitsui Kagaku Kogyo Co.) and a small amount of stabilizer was fed into a screw extruder having a diameter of 40 mm. to form a film of 0.1 mm. in thickness. The film was dipped in a tetrahydrofuran bath kept at 50° C. for 5 minutes, then dipped in a methanol bath kept at 50° C. for 30 seconds, and thereafter air-dried. The resulting film, like the film in Example 5, had beautiful pearl-like gloss and was easily printed, the ink adhesion being good.

Another effect obtainable by carrying out the pre-treatment is in the point that a watermarked paper-like article is obtained. Watermark is a pattern which is visually discernible by the slight differences of opacity between patterned and unpatterned areas. As is well known, in the case of paper, it is patterned by a dandy roll in the papermaking machine wire part to produce a watermarked paper, but, in the case of polymer films, since they are originally transparent, though opaque films are also produced by a few methods, no film which is watermarked exists. It is, of course, possible to pattern a polymer film by impressing it while heating to above its softening point, but, because, in that case, no difference in transparency exists between the impressed portion and the unimpressed portion, the resulting pattern cannot be seen to be a watermark.

However, if the film is patterned in advance with a liquid and thereafter subjected to the swelling agent non-swelling agent treatment, the permeability in the swelling agent treatment becomes different, and, in its turn, the opacity also becomes different, with the result that a watermark is obtained.

The liquids here used are broadly divided into swelling agents and non-swelling agents for the polymer substance, but they must be miscible with the swelling agent in the main treatment that is used after pre-treatment. If a swelling agent is used as the pre-treatment liquid, it is then preferable to use a different kind rather than the same kind of swelling agent in the main treatment, whereby good results are, in many cases, obtained. Also, in the case of using a non-swelling agent, with those which have viscosity to some extent, such as fluid paraffin, glycerine, etc., it is relatively easy to pattern the film, but is difficult with those which are low in viscosity, for example, alcohols such as methanol, ethanol, etc.; in such cases, if, for example, polyvinyl acetate is dissolved therein as a viscosity-increasing agent, the film can be patterned suitably. Further, if water is to be used, care must be taken to lower the surface tension by adding a surface active agent in addition to the use of polyvinyl alcohol as a viscosity-increasing agent, thereby making the liquid easy to be applied.

If the film is patterned in advance by applying the swelling agent pre-treatment, then, in consequence of the time of swelling agent treatment being prolonged, the patterned portion is much more swollen than the unpatterned portion so the opacity becomes different. Also, on the other hand, if the film is pre-treated by using a non-swelling agent, the swelling power of the patterned portion is weakened the moment the swelling agent applies to the film in the main treatment subsequent to the pre-treatment. And, in general, the amount of the swelling agent to be used in the main treatment is larger than the amount of the liquid in the pre-treatment, so the non-swelling agent with which the film has been patterned in the pre-treatment diffuses completely in a short time, and, thereafter, the patterned portion and the unpatterned portion, both come to be treated with a liquid having the same swelling power. However, since the time of swelling agent treatment is usually a short time of second unit, the substantial difference in treating time between such patterned portion and unpatterend portion exerts an influence upon the opacity, with the result that a watermark is obtained.

Hereunder, a definite example of obtaining a watermark by the above-mentioned method is given.

EXAMPLE 7

A non-plasticized polyvinyl chloride of $50\mu$ in thickness (made by Takasago Gomu Co.) is decorated in one surface with a pattern in advance by using fluid paraffin, nitrobenzene, methylethyl ketone, methylisobutyl ketone and tetrahydrofuran, immediately thereafter dipped in a mixed solution of 75 parts of tetrahydrofuran and 25 parts of isopropanol kept at room temperature for 3 seconds, then dipped in isopropanol kept at room temperature for 30 seconds thereby coagulated and thereafter dried. In all cases, an opaque film having a watermark was obtained.

Intermediate treatment

As repeatedly stated hereinabove, in this invention, the swelling agent-non-swelling agent treatment is always carried out, moreover it is possible to bring about an effect by inserting an intermediate treatment in between said swelling agent and non-swelling agent treatments. Hereunder, four methods concerning such intermediate treatment and the effects thereof are mentioned.

It has been already stated that, in some cases in the treatment according to this invention, the strength of the surface opacificated layer is low, presenting a "powder falling-off" phenomenon, and that, for preventing such phenomenon, the joint use of water is extremely effective. However, such "powder falling-off" can also be prevented even by inserting an intermediate treatment of the type mentioned below.

One method thereof comprises drying the film once to some extent after the swelling agent treatment and thereafter treating the film with a non-swelling agent. If a polymer film is surface-treated with a swelling agent therefor and thereafter dried for an appropriate time at an appropriate temperature, then, with the evaporation of the liquid swelling agent, the concentration of the swollen or semi-dissolved portion of the surface becomes high and simultaneously a part of the swelling agent further penetrates to the inner part of the film, thus making the swelling progress. If the concentration becomes high as mentioned above, the film, when coagulated by a non-swelling agent in the next treatment, achieves an opaque layer closer in texture and penetrating deeper into the film, with the result that the surface strength is improved. This intermediate drying treatment is limited to the point that the film can be kept in shape. Simultaneously, the liquid swelling agent remains to some extent without evaporating completely. As the extent of the drying progresses, the surface bonding strength becomes high and the gloss becomes greater, but, to the contrary, the opacity and brightness tend to become slightly lower; therefore, even from such aspects of quality, it becomes necessary to select appropriate conditions. Examples of this treatment are given hereunder.

EXAMPLE 8

A plasticized polyvinyl chloride film of $50\mu$ in thickness was dipped in a mixed solution of 90 parts of tetrahydrofuran and 10 parts of methanol for 3 seconds at room temperature, then taken out of the dipping bath and air-dried for 20 seconds at room temperature, subsequently further dipped in methanol for 30 seconds at room temperature, and thereafter air-dried. The resulting film, as compared with a film treated without inserting the intermediate drying process, was particularly superior in surface bonding strength and gloss and exhibited no great difference in brightness and opacity, as shown in the following table.

| | Surface bonding strength [1] | Gloss, percent | Brightness, percent | Opacity, percent |
|---|---|---|---|---|
| Film treated by inserting drying process | Does not pick with No. 16 Tack ink | 60 | 91 | 81 |
| Film treated without inserting drying process | Picks with No. 12 Tack ink | 10 | 92 | 83 |

[1] Measured by an RI printing tester (a product of Akira Seisakusho Co.).

EXAMPLE 9

A biaxially-oriented polystyrene film of $50\mu$ in thickness (Styrex made by Mitsubishi Jushi Co.) was dipped in a mixed solution of 1 part of carbon tetrachloride and 1 part of acetone for 1 second at room temperature, then taken out of the dipping bath and air-dried for 5 seconds at room temperature, subsequently further dipped in methanol for 60 seconds at room temperature, and thereafter air-dried. In this case, too, like in the preceding example, a film having superior surface bonding strength and gloss was obtained.

A high-pressure polyethylene film of $50\mu$ in thickness was dipped in toluene kept at 90° C. for 2 seconds, then taken out of the dipping bath and dried for 5 seconds at 50° C., subsequently further dipped in ethanol for 30 seconds, and thereafter air-dried. In this case, too, the improvement in surface bonding strength was evident.

Another method for preventing "powder falling-off" by the intermediate treatment is characterized by continuously carrying out a surface treating operation of three or more stages such as treating the surface with a first swelling agent, then with a second swelling agent lower in swelling power than said first swelling agent, and thereafter with a non-swelling agent.

The agents which have lesser swelling power than the swelling agent in the first-stage treatment may include the following:

(1) the swelling agent used in the first-stage treatment to which a non-swelling agent has been added to lessen the swelling power;
(2) a swelling agent which is different in kind from and lesser in swelling power than the swelling agent used in the first-stage treatment, either independently or mixed with a non-swelling agent;
(3) the swelling agent used in the first-stage treatment with which a swelling agent of lesser swelling power has been mixed; and
(4) the swelling agent used in the first-stage treatment, but at a lower temperature than used in the first-stage treatment, either independently or mixed with a non-swelling agent;

and the liquids mentioned in (1)–(4) must all be miscible with the swelling and non-swelling agents used in the first-stage treatment.

In order to keep the surface bonding strength of the opaque layer of the film surface high, it is necessary to insure that the swelling treatment carried out in the first stage advance as deeply as possible into the film. On the other hand, as stated hereinabove, if the liquid swelling agent treatment progresses too much, the film gets out of shape to bring about inconvenience. However, if the film is surface-treated first with a liquid swelling agent and then with a liquid which, though having the swelling property, is lower in swelling power than said liquid, as in this intermediate treatment, there occur phenomena such that the swelling velocity is reduced and that the surface assumes a semi-coagulated form, with the result that the film becomes hard to get out of shape and the portion of the swelling agent in the first-stage treatment that is present in the film penetrates deep into the film, thereby bringing about the effect that the first-stage treatment is substantially prolonged; thus, the treatment is carried out beyond the limit of the first-stage treatment and, in consequence, contributes towards improving the surface strength.

EXAMPLE 10

A plasticized polyvinyl chloride film of 50μ in thickness was treated under the following conditions and thereafter dried to obtain four samples described in the table hereunder. In this case, the first-stage treatment was carried out as long as possible. If the treating time were prolonged, the film would get out of shape. The surface treatments were, in all cases, carried out by dipping the films into the solutions.

The properties of the resulting films are as shown in the following table. As is clear from the table, the Samples B, C and D subjected to the treatment according to this invention, as compared with the untreated Sample A, were particularly superior in surface strength and also improved in brightness and opacity.

|  | Surface bonding strength [1] | Gloss, percent | Brightness, percent | Opacity, percent |
| --- | --- | --- | --- | --- |
| Sample A | Picks with No. 12 Tack ink | 8 | 90 | 80 |
| Sample B | Does not pick with No. 16 Tack ink | 8 | 95 | 86 |
| Sample C | do | 7 | 94 | 84 |
| Sample D | do | 8 | 93 | 84 |

[1] Measured by an RI printing tester.

EXAMPLE 11

The same film as in Example 10 was subjected to the following four-stage dipping treatment and thereafter dried to obtain a film having surface bonding strength which does not pick with No. 16 Tack ink.

Parts

First stage:
    Tetrahydrofuran _____ 95
    Methanol _____ 5
    17° C., 6 seconds.

Second stage:
    Tetrahydrofuran _____ 6
    Methanol _____ 4
    17° C., 3 seconds.

Third stage:
    Tetrahydrofuran _____ 3
    Methanol _____ 7
    17° C., 5 seconds.

Fourth stage:
    Methanol.
    17° C., 30 seconds.

EXAMPLE 12

A high-pressure polyethylene film of 50μ in thickness was first dipped in toluene kept at 90° C. for 2 seconds, thereby surface-treated up to the limit, then dipped in toluene kept at 50° C. for 5 seconds, further dipped in methanol for 30 seconds at 20° C., and thereafter air-dried. The resulting film, as compared with a film not treated in the toluene kept at 50° C., was superior in surface bonding strength, brightness and opacity.

As stated at the beginning of the explanations, if a polymer film is treated with a swelling agent for said substance and successively with a non-swelling agent, then, by the shrinking in volume at the time the swollen portion coagulates, the surface is roughened, but, as an inevitable result thereof, the gloss which is one of the characteristics inherent in the polymer film is almost lost. For satisfying the conditions that the surface be roughened and that gloss be given, which, at a glance, appear to be contradictory, it is necessary to make the surface into an extremely delicate rough surface. As stated hereinabove, if the film is treated with a swelling agent, then once dried and thereafter treated with a non-swelling agent, a film having high gloss is obtained. However, separately therefrom, it is also possible to obtain a glossy film even by carrying out the intermediate treatment mentioned below.

|  | First Stage | Second Stage | Third Stage |
| --- | --- | --- | --- |
| Sample A | Tetrahydrofuran, 20° C., 7 seconds | None | Methanol, 20° C., 30 seconds. |
| Sample B | do | Tetrahydrofuran, 4 parts / Methanol, 6 parts 20° C., 5 seconds. | Do. |
| Sample C | do | Acetone, 20° C., 2 seconds | Do. |
| Sample D | do | Acetone, 5 parts / Methanol, 5 parts 20° C., 5 seconds. | Do. |

That is to say, the treating method here is characterized by pressing a polymer film onto a physical solid having a mirror-like surface or smooth surface while the film still has plasticity after surface-treated with a swelling agent, and thereafter treating the film with a non-swelling agent. If such intermediate treatment is applied, a film having high gloss can be obtained even in such a combined, for example, acetone-methanol treatment in the case of polystyrene film in which a glossy article cannot be obtained. It is also possible to obtain films having various degrees of gloss by varying the surface of a physical solid onto which the film is to be pressed or the extent of the pressing.

The surface to be used here for pressing is suitably a mirror-like surface or smooth surface such as that of a metal or glass plate, but, it is preferable to process the surface thereof in advance with a substance such as tetrafluoroethylene, silicone rubber or the like which is hard to adhere, thereby making it easy to release the film after pressing. Here, the surface for pressing is not always limited to a smooth surface or mirror-like surface; even if the film is pressed onto a surface such as uneven surface, paper surface or sandblasted rough metal or glass surface, the film can transcribe that surface, but, needless to say, in these cases, the surface does not become a glossy delicate rough surface.

The most important of such intermediate treatment is in the time of pressing the film while the surface thereof has appropriate plasticity or fluidity. When the plasticity is too high, it suffices only to press the film very lightly, whereby the film can transcribe the smooth surface, but, on the other hand, in that condition, the film becomes easy to get out of shape and also becomes difficult to release, so the handling is extremely difficult. Accordingly, it is necessary to select such condition in which the film does not get out of shape even when released after pressed onto a surface for pressing. That is to say, the time at which the film is to be pressed onto a surface for pressing is immediately after treating the film with a liquid swelling agent or after drying the so treated film to some extent to make the surface concentration high, or after treating the film to some extent with a non-swelling agent subsequently to the swelling agent treatment but while the film though semi-coagulated, still retains a plasticized state. Also, the pressing treatment may be effected with respect to one or both surfaces.

Subsequently to the pressing treatment onto a smooth surface of the type mentioned above, the film is released from said surface and thereafter or while being released treated with a non-swelling agent to obtain a paper-like article which is glossy and which has a delicate rough surface. According to this method, even if a film having little gloss, such as high impact polystyrene film formed by an ordinary extruding method or calender, is used as polymer substance, it is possible to make the film have high gloss.

EXAMPLE 13

A biaxially-oriented high impact polystyrene film of 100μ in thickness (made by Mitsubishi Monsanto Co.) was dipped in methylisobutyl ketone kept at 20° C. for 5 seconds, thereafter held between two highly-polished glass plates and lightly pressed, then released from the glass plates, dipped in methanol kept at 20° C. for 30 seconds and air-dried. The results of comparison with a control article not pressed onto the glass plates are as shown below.

| | Gloss, percent | Gloss after Indigo-Blue ink printing, percent |
|---|---|---|
| Processed article of this invention | 93 | 51 |
| Control article | 20 | 37 |

EXAMPLE 14

A cellulose triacetate film (made by Fuji Film Co.) having a thickness of 80μ was dipped in a mixture of one part by weight of methyl acetate and one part by weight of acetone at the temperature of 20° C. for a period of five seconds, and then one surface of the film was pressed slightly onto a glass plate. After being released the plate, the film was dipped in petroleum-benzine for a period of one minute to secure complete coagulation. Thus an opaque film having an excellent gloss was obtained as in the previous examples.

It has already been described that an opaque film having watermarks on it can be obtained by the pretreatment before the swelling agent treatment. However, such films having watermarks can also be obtained by an intermediate treatment as described hereinafter.

The watermarked opaque film can be produced by treating the film with non-swelling agent treatment subsequent to the swelling agent treatment, pressing the film surface, which is in a state of semi-coagulation during the non-swelling treatment, against a watermark pattern, and thereafter solidifying it completely.

As described in the preceding paragraph, the film surface becomes plastic when swollen, and the watermark pattern can be embossed by pressing it against the surface while the latter is still in the plastic state. However, if pressing is effected immediately after the swelling agent treatment, even extremely slight pressure is enough to make the pattern too deeply impressed, and difference between impressed and unimpressed part of the surface becomes so great and the pattern is so clearly discernible that it can hardly be called a watermark. Moreover, when the film is in such a swollen condition, its strength is insufficient that there may arise trouble in the printing treatment. According to the present invention, therefore, the film, after treated with a swelling agent, is made semi-coagulated or half-hardened by the subsequent treatment with a non-swelling agent, and the pressing step is performed in this condition.

When the pattern is embossed with the film in such semi-solidified state, numerous minute pores produced by coagulation are destroyed, but even when the pressure is removed, the pores have no power of recovering to their former shapes and remain in the crushed state, thus making the area of light scattering smaller, with the result that difference in opacity decreases and the watermark is thereby obtained.

In this treatment it is necessary to give variation to the treating method depending upon the time when printing is performed. That is, at the earliest stage of coagulation, the pressure employed must be extremely slight and as the degree of coagulation increases, care should be taken to increase pressure progressively.

The above-mentioned printing conditions may vary according to the thickness of the film, the kind (or swelling power) of the swelling agents employed, the treating conditions of the swelling agents, but in each case they can be determined by experiment.

The printing operation requires no special apparatus, but it can be performed by passing the film between a pair of nips, for example, between an engraved metal roll and a rubber or a cotton roll.

Thus, by adopting a different method from that of Example 7, the same effect can be obtained, and the embodiment thereof will be illustrated in the following.

EXAMPLE 15

A biaxially-oriented polystyrene film (Styrex, made by Mitsubishi Jushi Co.) having a thickness of 50μ was first dipped in a mixture of 9 parts acetone and 1 part carbon tetrachloride for a period of two seconds at room temperature, and then dipped in isopropanol also at room temperature. While the film was still dipped in isopropanol, comparatively little pressure was applied to it by means of a stamping roll. A good watermark pattern was printed when application of the pressure was performed within 3–15 seconds after immersion of the film started.

Additives

Suitable additives can be added to the liquid containing the swelling and the non-swelling agents employed in the process of the invention to obtain paper-like articles having various characteristics, and the detailed explanation thereof will be given below.

EXAMPLE 16

A plasticized polyvinyl chloride film (commercially available, maker unknown) having a thickness of $50\mu$ was first dipped in tetrahydrofuran contatinining 0.1% Oil Red Dye at room temperature for a period of five seconds, after which the film was dipped in methanol also containing 0.1% Oil Red Dye at room temperature for ten minutes, and air-dried.

As shown in this example, a colored opaque film is obtained by adding to the treating solutions dyes soluble in the swelling and/or non-swelling agents. By this kind of treatment, the dye penetrates into the interior of the film, and a firmly colored film is thereby obtained. Moreover, as will be fully explained later, since all the paper-like articles of the invention have heat-sensitive as well as pressure-sensitive characteristics, it is advantageous for them to be color-treated, because, when they are used as heat-sensitive or pressure-sensitive copy paper, color-treatment will give them clearer contrast.

Surfactants and/or antistatic agents likewise use of dyes above-mentioned may be used to improve surface wettability and enhance antistatic effect. Especially, the effects derived from addition of surfactants are that it can achieve improvement in the wettability of the film surface with water, and that it enables the water paint, emulsion, or aqueous solution as well as the apparatus hitherto used for paper coating in paper manufacturing industry to be employed without modification for the purpose of uniformly coating the polymer films, thus making it possible to manufacture film-based coated paper-like articles. In addition, the coated paper-like articles produced in this method can bring about advantageous result of stronger surface bonding strength on the coated side, because their base films are given anchoring effect owing to their roughened surface.

EXAMPLE 17

A biaxially-oriented polystyrene film (trade name, "Styrex" from Mitsubishi Jushi Co.) having a thickness of $30\mu$ was dipped in acetone at room temperature for a period of two seconds, and then surface-treated by dipping it in methanol containing 0.1% of antistatic agent (trade name, "Anstex C–200" from Toho Kagaku Co.) for a period of 20 seconds. Coating color having the following composition was applied by means of the applicator bar at the coverage of 15 g./m. to the treated film, and the film was drier for ten minutes at 40° C. to become a coated paper-like article.

| | Parts |
|---|---|
| Coating clay | 100 |
| Oxidized starch | 15 |
| Butadiene-methylmethacrylate synthetic rubber (trade name, "Polylac ML–501" from Toyo Koatsu Co.) | 13 |
| Water | 157 |

The film was further treated by means of super-calender at room temperature by loading the linear pressure of 90 kg./cm. The treated film had an excellent smoothness and glass and its printability was superior to the conventional coated paper.

Generally, contact angle of water to the surface of polymer films is larger, and this fact is responsible for the difficulty of uniformly coating such surface with water paint (this term refers to paint composed of aqueous solution, emulsion, or aqueous dispersion of pigments or similar materials). As is explained above, however, in the two-bath treatment of the swelling agent and non-swelling agent, wettability of the films may be improved by previously dissolving a surface active agent in the treating solutions. In addition, water paint coating of polymer film is made possible by an alternative method, explanation of which will be given below.

This method is characterized by treating the surface of polymer films with a water-miscible swelling agent, and immediately after the treatment or after the lapse of a certain time during which the film surface is dried to some extent, coating water paint onto the layer of said swelling agent. In other words, this method uses water with various materials dissolved or dispersed therein, instead of the non-swelling agent in the second treatment step successive to the initial swelling agent treatment.

According to the present invention, since the liquid used in the first treatment is a swelling agent for the polymer material employed, the uniform wetting of the film surface is possible, and if water paint coating is performed while the liquid is still present on the film surface, both the liquid and the paint are intermixed, and the water paint can be coated with uniformity. Moreover, by intermixture or substitution of the swelling agent with the water paint, some components of the water paint may penetrate into the interior of the film, which also gives a favorable effect.

As can be understood from the above descriptions, polymer substances employed in the present invention as base material must be limited to those having such property as can be swollen by a water-miscible liquid, although blend polymer materials, one component of which that can be swollen by water-miscible liquid constitutes more than a certain proportion, can also be used.

Moreover, this method is not necessarily limited to use of water paint, but is also applicable to organic solvent paint in the same manner as shown above.

EXAMPLE 18

A biaxially-oriented polystyrene film (trade name, "Santclear" from Mitsubishi Monsanto Co.) having a thickness of $40\mu$ was coated on one side with a liquid mixture composed of 9 parts acetone and 1 part water by means of an applicator bar at the coverage of 5 g./m.$^2$. Immediately after the coating treatment the film was again coated by an applicator bar with polyvinylidene chloride copolymer latex (trade name, "Saranlates MA–42" from Asahi-Dow Co.) that has already been colored blue with Alizarin Saphirol B (from Mitsui Kagaku Co.) at the coverage of 6 g./m.$^2$. The treated film had a uniform coloration in blue, which showed that the film was coated with corresponding uniformity.

EXAMPLE 19

A biaxially-oriented polystyrene film (trade name, "Styrex" from Mitsubishi Jushi Co.) having a thickness of $50\mu$ was coated on one side by means of an applicator bar with acetone at the coverage of 20 g./m.$^2$. Three seconds after the initial coating, a coating color having the following principal composition was applied to the same side at the coverage of 19 g./m.$^2$.

| | Parts |
|---|---|
| Coating clay | 100 |
| Casein | 15 |
| Styrene-butadiene latex (trade name, "Dow Latex No. 636" from Asahi-Dow Co.) | 15 |
| Water | 170 |

As a result, the coating color was uniformly distributed, and a film resembling high quality printing paper with sufficient surface bonding strength was obtained.

When the two-bath treatment of a swelling and a non-swelling agent of the invention is applied to polyethylene film, the present method is accompanied with several practical disadvantages. One of them is that an elevated temperature as high as at least 50° C. is necessary in order to give sufficient opacity to polyethylene by means of the swelling agents such as benzene, toluene, xylene, carbon tetrachloride, etc. Another difficulty is that by this treatment alone the strength of the layer thus made opaque is so weak that it is liable to be stripped off the base film.

These drawbacks, however, can be corrected by adding suitable additives to the treating solutions as is further explained below. According to the present invention such additives as (1) polystyrene or polyvinyl chloride, (2) rubbery materials of diene series, and (3) thermosetting resins are previously dissolved in a swelling agent for polyethylene, and the polyethylene film surface is swollen with the swelling agent containing the above-mentioned additives while at the same time coated with the above-described painting materials. After treated with non-swelling agent and coagulated, the film is dried and heat-treated.

In practice of the treatment, it is more advantageous to pretreat the polyethylene film surface by means of corona discharge, dichromate oxidation treatment, etc. The preferable swelling agents to be used for this purpose are benzene, toluene, xylene, carbon tetrachltride, tetrahydrofuran, etc.

The main component of the materials coated on the surface of polyethylene film is polystyrene or polyvinyl chloride, and the copolymer or mixed polymer chiefly composed of the above substances can also be employed. Rubber of diene series is used to ensure firm adherence between said polystyrene or polyvinyl chloride and the polyethylene base film, and styrene-butadiene copolymer, acrylonitrile-butadiene copolymer, polychloroprene, polybutadiene, etc. may be used for this purpose. Addition ratio of the rubber of diene series to polystyrene or polyvinyl chloride added should be at least 5%.

Thermosetting resins are added in order to give suitable hardness to the surface of opaque layers. For this purpose, melamine-formaline resin, urea-formaline resin and the like, as well as their modifications whose condensation is in a low stage of progress and which are soluble in the above-mentioned swelling agents can be used. Preferably, addition ratio of such resins is more than 5% of polystyrene, etc.

In the treatment with a swelling agent having the above-described composition, no special heating is required, because even at room temperature a satisfactory result can be obtained within very short duration of a few seconds. After the swelling agent treatment, the film is again treated with non-swelling agent in accordance with the usual procedure in this invention, but the treatment, being explained in this paragraph, with non-swelling agent is preferably effected after the film surface has been dried slightly in order to decrease the loss of the coated layer. In this connection it should be noted that the non-swelling agent used herein is not necessarily required to possess non-swelling property for the thermosetting resins employed, and that some degree of swelling property is rather preferred, because a better result is thereby obtained in the hardening reaction resulting from subsequent heat treatment. It is desired that the heat treatment after coagulation treatment should be carried out at as high temperature as possible so far as no adverse effects are occurred on either the base film or the formed layer.

EXAMPLE 20

A polyethylene film (commercially available, maker unknown) having a thickness of 50μ was dipped in a prepared liquid consisting of 100 parts toluene having dissolved therein 10 parts polystyrene (trade name, "Stylon 666" from Asahi-Dow Co.), 5 parts nitrile butadiene rubber (separated modified from "Hycar latex 1552," Nippon Zeon Co.) and 5 parts butylated melamine resin (trade name, "Yuban 20S–Bu65" from Toyo Koatsu Co.) for a period of 3 seconds at room temperature, air-dried for 15 seconds, and then coagulated by dipping in methanol at room temperature for 30 seconds. Thereafter the film was dried and heat-treated for 10 minutes at 80° C. A film of high opacity having uniformly and closely gathered fine particles on the surface was obtained. The surface layer thus formed had a high gloss, showed firm resistance to the rubbing action of abrasive paper, and was strongly adhered to base material. In addition, the film surface was able to be marked with pen or pencil, and was easy to be printed upon.

In the swelling an non-swelling agent treatment of the invention, when a blowing agent soluble in the treating solutions is added to said solutions, there is obtained a special heat-sensitive copy paper, on which the shape of letters can be elevated in relief by copying operation; that is, the letter forms can be embossed on the paper by copying. Since these letter forms can be clearly distinguished by the sense of finger touch, said paper will find application in the field of braille copy paper for the blind.

For the above-described purpose, film materials having relatively low softening point or melting point such as polyethylene, polyvinyl chloride, polystyrene, rubber hydrochloride, etc. are preferred. When usual swelling agent treatment is carried out with the object of making such films, selection of a swelling agent having comparatively high swelling power is preferred since it is advantageous for a blowing agent contained in the swelling agent to penetrate as deep as possible into the interior of film base.

The blowing agent should be soluble in the swelling agent employed, and its choice must be dependent upon the softening or melting point of polymer materials; blowing agents having heat decomposition temperature of less than 150° C. such as given below are preferred. The amount of such blowing agent should be substantially more than 0.5% by weight of the treated film, and blowing agent having lighter or no color is advantageous. The suitable foaming agents are: tert-butylamine nitrite, guanidine nitrite, 1,1'-dithiodiformamidine, N-nitro-N'-cyclohexyl urea, diazoaminobenzene, 2,2' - azobisisobutyronitrile, 1,1'-azobiscyclohexanecarbonitrile, diethylaminosulfonyl hydrazide, benzenesulfonyl hydrazide, p-tert-butylbenzoyl azide, N,N' - dimethyl-N,N'-dinitrosoterephthalamide, 1 - methyl - 3 - phenyl-triazine, benzenediazonium chloride, diazoacetoamide, azodicarboamide, diethylazodicarbonate, thiophenylhydrazone, trinitrosotrimethylenetriamine, carbamylazide.

After the film surface has been treated with the swelling agent containing such blowing agent, it is coagulated by the non-swelling agent and dried according to the usual procedure in this invention. However, the film can be dried directly after the swelling agent treatment omitting the subsequent non-swelling agent treatment.

When special heat-sensitive copying is performed using thus produced film containing a blowing agent, heat-sensitive office copying machine now widely in use can be employed without modification in the same manner as in the case of ordinary heat-sensitive copy paper. Namely, when the treated film is placed on the original paper having lines or drawings thereon and is passed through the machine, an opaque and solid or embossed copy is obtained, because the heat from the infrared heater inside initiates selective heat absorption in the area of lines or drawings and the heat transmitted onto the film causes the blowing agent to function in the area exactly corresponding to the original figure, thus making the area swollen or protruded. In order to further facilitate foaming or protrusion in copying operation, it is advisable to cover the film with a mesh screen, and preferably a suitable mesh size should be selected depending upon the respective copying objects.

EXAMPLE 21

Two samples were employed in this example; one of them was prepared by dipping a biaxially-oriented polystyrene film (trade name, "Styrex" from Mitsubishi Jushi Co.) having a thickness of 50μ in a solvent mixture of 65 parts benzene and 35 parts methanol containing dissolved therein 2 parts of diazoaminobenzene for a period of two seconds at 20° C. and drying without further treatment. The second sample was prepared in the same way as the first, except that its preparation was followed by a treatment of dipping in methanol for 30 seconds at 20° C. and air-drying at room temperature. These samples were inserted (A) between a newspaper and a 100 mesh silk screen, copied by "Thermofax" Copying Machine (from Minnesota Mining Mfg. Co.), and clear copy of letters in white relief were obtained. Next, they were inserted (B) between the original paper printed black with 22 point numeral types and a 19 mesh silk screen, and copied by the same machine. Clearly embossed figures distinguishable by the sense of touch were produced.

After-treatment

The following description concerns the after-treatment of the invention subsequent to the swelling agent and non-swelling agent treatment.

Although it is possible to treat only one side surface of the film according to the invention, thus treated film is attended with shrinkage or deformation, and there are formed so many curls and wrinkles difficult to be corrected even by the usual heat treatment that the finished film cannot be of practical use. However, a satisfactory film without any curls or wrinkles can be obtained according to the one-side treatment described below.

For the purpose of roughening or coarsening only one surface of the film we use bag-shaped polymer film formed by inflation technique for instance, or folding a piece of film in two or superposing two pieces of film, closely contact them mechanically or electrostatically. Using thus prepared film we then treat it by a swelling agent. When pieces of the film properly contacted by either of the above methods are dipped in a swelling agent bath for a suitable period of time, the agent penetrates only slightly inside of the peripheral area by capillarity, with a favorable result of causing said area to be solvent-fused or sealed. With the peripheral part thus fused or sealed completely together, the swelling agent cannot penetrate into the interior, and the two pieces of film can thereby be treated only on the respective outer surface. After treating in above manner, we treat the film also with a non-swelling agent to coagulate the surface, and after drying we obtain two flat pieces of film sealed in bag-like form with only the respective one surface treated.

Since the pieces of roughened film by above treatment are kept flat in moment equilibrium in the respective direction of curls (i.e. on each treated side), each piece is expected to curl up on the treated side when the sealed area has been cut off. However, when the bag-shaped film is heat treated for a period of 1–30 minutes at an appropriate temperature and then trimmed off the sealed area, flat film without any curls or wrinkles can be obtained. In the above heat treatment any ordinary technique may be employed so far as the temperature be maintained below the melting point of polymer film material used.

EXAMPLE 22

Two pieces of polystyrene film (Styrex, from Mitsubishi Jushi Co.) having a thickness of 50μ were closely contacted and passed through contact rolls positioned in acetone at room temperature at an interval of approximately 15 cm. with the traveling rate of 3–4 seconds. After being dipped in methanol for 30 seconds, they were dried by air current of 70° C., correction treated in a hot-air drier at 70° C. for 3 minutes, and then the sealed area (about 2 mm. wide) of the bag-shaped combination was trimmed off.

The thus obtained piece was perfectly free from curls or wrinkles, and was extremely flat, the non-treated surface of the polystyrene film was exactly as it had been before, but on the treated side was produced a uniformly roughened surface, which could be marked even with pencils.

As an after-treatment, surface polishing, for example, by means of supercalender ordinarily used in paper manufacturing industry is also effective. When the surface is made smooth by destroying or crushing numerous minute pores to a certain extent by means of super-calender after the swelling agent and non-swelling agent treatment, printability of the film is improved without substantial decrease in the absorbing rate of printing ink.

The following explanation is concerned with an embodiment illustrating successive treatment of polystyrene film with acetone and methanol. The film obtained by such treatment is opaque and white in color, and has a delicately roughened surface. When printing is done upon it at a given condition, however, in spite of extremely rapid absorption of ink, representation of half-tone dots is poor and the printing image lacks sharpness and becomes mat. But by treating said film by means of super-calender and performing printing operation at the same condition as above, we can improve half-tone dot representation without substantial decrease in ink absorption, with a natural result of the printed image being sharp and having superior ink gloss.

This phenomenon will be interpreted as below. When polystyrene film is treated with acetone and methanol, comparatively large pores, such as can be clearly recognized even with a microscope of low magnification, are produced, and rapid absorption of printing ink and poor ink gloss are considered to be attributable to this type of poor formation. However, such numerous pores formed on the surface are pressure-sensitive, and are readily destroyed or crushed by pressure, being unable to recover themselves to their former shape. Accordingly, if the degree of pressure is suitably chosen, they will not be completely crushed or destroyed, but allowed to retain a certain amount of void space within them even when the surface is rendered much smoother. It is well known that smoothness of printing surface is one of the prerequisites in printability, and especially a polymer film, being less cushiony than paper, is greatly affected in its printability even by so delicately roughened a surface as can easily be tolerated in the case of paper. As can be understood by above description, if printability of a film remains unsatisfactory by means of the swelling agent and non-swelling agent treatment alone, it can be improved by so treating the surface with pressure rolls that a certain amount of minute cavities are retained and at the same time smoothness of the film surface is improved.

Preferably pressure treatment is performed by means of calender consisting of more than two rolls, especially by supercalender composed of cotton rolls and steel rolls. Essentially polymer film has little plasticity below softening temperature, so that it is difficult to impart smoothness to its surface by application of pressure. According to the invention, however, the layer having pressure-sensitive pores, which can be crushed by giving pressure, has already been built up, so that it is possible to make thus treated surface smoothened even at room temperature. The higher the treating temperature is raised, the easier is the smoothing treatment by means of calender, but the temperature should by all means be maintained below the melting point of the respective materials employed. Since pressure treatment causes partial destruction of the minute pores, a certain degree of loss of film opacity is unfavorable. And if the pressure treatment conditions are to severe (i.e. high temperature and high pressure), the pores may be completely destroyed, and although the film surface becomes as smooth as it was before the swelling agent treatment, absorbing rate of ink is entirely lost. This phenomenon is a disadvantageous result of all the treatment including pressure treatment. Accordingly, the most favorable conditions of pressure treatment should be determined in each case depending upon the polymer film materials used and the treating conditions of swelling agent and non-swelling agent.

EXAMPLE 23

A biaxially-oriented polystyrene film (made by Mitsubishi-Monsanto Co.) having a thickness of 50μ was treated at room temperature under the following conditions;

| Sample | Swelling agent | Treating time (second) | Intermediate drying | Nonswelling agent | Treating time (second) |
|---|---|---|---|---|---|
| A | Acetone | 2 | Omitted | Methanol | 30 |
| B | Acetone, 1 part; carbon tetrachloride, 1 part. | 2 | do | do | 30 |
| C | Methylisobutyl ketone, 9 parts; methanol, 1 part. | 3 | Done | do | 30 |

Surface smoothness of these samples was satisfactory in the increasing order of C, B and A, and they were directly used in relief printing (phototypography) by means of Vandercook Proof Press, and their printing effects was found to be superior in the same order of C, B and A. These three kinds of samples were passed twice through the nip of cotton roll and steel roll in the test supercalender at the surface temperature of 40° C. and nip pressure of 50 kg./cm., and then printed under the same conditions as above. Although absorbing rate of ink decreased slightly in each sample, halftone dot representation was improved and excellent prints were obtained.

EXAMPLE 24

A high pressure polyethylene film having a thickness of 70μ was dipped in toluene for a period of one second of 95° C., and then dipped in a liquid mixture of 9 parts methanol and 1 part water at room temperature for 30 seconds to effect coagulation. After being dried, the film was passed for once between a pair of steel rolls at the surface temperature of 40° C. and nip pressure of 40 kg./cm. Using thus treated film printing was carried out by means of the same relief type press as in the previous example, and an excellent printed image was obtained. In this connection, one of the conspicuous effects was that the printing ink was adhered more satisfactorily than was the case with printing of an ordinary polyethylene clear film having no such treatment as above.

As can be seen from detailed explanations given above, when polymer film undergoes successive treatments with both the swelling agent and non-swelling agent of the invention, various kinds of paper-like film, derived from different raw materials for said film, having various appearances, and surface, writability, or printability can be obtained by varying particular treating conditions as well as by proper combination of several kinds of treatment such as pretreatment, intermediate or after-treatment with or without the use of suitable additives. The paper-like film of the present invention can serve as a substitute for paper for nearly all purposes such as for writing, drawing, printing, typewriting, labeling, corapping, decorating, water-proofing, oil-proofing, corrosion-inhibiting etc.

Moreover, when coating color commonly used in paper manufacture is applied onto the surface of treated film, printing paper-like film may be produced and the printability of it is far superior to conventional coated paper.

In addition, the film of the invention can be used for the purpose of pressure-sensitive as well as heat-sensitive copying, since the opaque layer of the surface provided by our treatment is pressure- and heat-sensitive, so that the layer is rendered transparent in the pressed or heated areas. Also, the above properties may be utilized in preparing gracefully patterned paper-like articles with transparent and opaque areas beautifully interlaced. Such articles can easily be produced by means of heat-pressure embossing treatment of our film using ordinary embossing rolls.

In addition to these polyethylene film having a beautiful pearl-like gloss, polystyrene film having air permeability, watermarked opaque film may be prepared, and now it is possible to manufacture special copy paper on which letters or drawings are embossed or elevated when passed through a heat-sensitive copying apparatus, so that the copied lines or dots can have a solid or cubic form. This will be used as braille copy paper for the benefit of the blind.

As described hereinabove, the paper-like articles of this invention has a wide variety of uses and its practical value is extremely great.

Although the term "film" has been used throughout the present specification, it should be understood that all the above-described treatments are also applicable to the object that is commonly termed "sheet."

We claim:
1. A method of manufacturing a paper-like article from a polymer film, comprising the steps of:
   (A) a first stage of treating a surface of the film with a swelling agent, thereby forming a swollen layer without distorting the film;
   (B) a second stage of treating said swollen layer of undistorted film with at least one additional swelling agent of a lower swelling power than the previous swelling agent, the additional swelling agent being co-miscible with the previous swelling agent, without distorting the film;
   (C) a third stage of treating the swollen layer with a coagulating agent, whereby the swollen layer is coagulated, said coagulating agent being co-miscible with said swelling agents and inert to the film;
   (D) a fourth stage of drying the film, whereby an opaque roughened layer is formed on the film to provide a paper-like article with a surface having a sufficient surface bonding strength so as to prevent powderization thereon.

2. A method of manufacturing a paper-like article as claimed in claim 1, wherein said polymer film and said corresponding swelling agents of said first stage therefore are selected from groups respectively consisting of materials listed as follows:

| Group No. | | |
|---|---|---|
| 1 | Polyvinyl chloride | Tetrahydrofuran, cyclohexanone, dioxane, and methylethyl ketone. |
| 2 | Vinyl chloride-vinyl acetate copolymer | Do. |
| 3 | Vinyl chloride-vinylidene chloride copolymer | Do. |
| 4 | Polystyrene | Acetone, methylethyl ketone, methylbutyl ketone, carbon tetrachloride, benzene, xylene, toluene, solvent naphtha, cyclohexanone, ethyl acetate, and butyl acetate. |
| 5 | Polyacrylonitrile | Dimethyl sulfoxide, and dimethyl formamide. |
| 6 | Polymethyl methacrylate | Acetone, methylethyl ketone, benzene, and xylene. |
| 7 | Polyethylene | Carbon tetrachloride, benzene, toluene, and xylene. |
| 8 | Nylon | Phenol and cresol. |
| 9 | Polyurethane | Acetone, carbon tetrachloride, and ethylene dichloride. |
| 10 | Polycarbonate | Acetone, benzene, xylene, and ethylene dichloride. |
| 11 | Rubber hydrochloride | Benzene, xylene, cyclohexanone, and ethyl acetate. |
| 12 | Cellulose diacetate | Ethyl acetate, acetone, and methylethyl ketone. |
| 13 | Cellulose triacetate | Methyl acetate, methylene dichloride, chloroform, and tetrahydrofuran. |
| 14 | Nitrocellulose | Ethyl acetate, and acetone. |

3. A method of manufacturing a paper-like article as claimed in claim 1, said polymer film being a polystyrene film, said swelling agents of said first stage being selected from a group consisting of acetone, methylethyl ketone, methylbutyl ketone, carbon tetrachloride, benzene, xylene, toluene, solvent naphtha, cyclohexanone, ethyl acetate and butyl acetate.

4. A method for manufacturing a paper-like article as claimed in claim 1, further including the step of printing a watermark pattern upon said film prior to treating it with said first swelling agent.

5. A method of manufacturing a paper-like article as claimed in claim 1, further comprising the steps of treating said film with a non-swelling agent after drying, of dissolving a surface active agent in at least one of said agents prior to the treatments of said film with them whereby said treated film surface becomes wettable.

6. A method of manufacturing a paper-like article as claimed in claim 1, at least one of said swelling agents having a foaming agent dissolved therein.

7. A method of manufacturing a paper-like article as claimed in claim 1, further comprising the step of intermediately drying said swollen layer prior to the application of a first additional swelling agent.

8. A method of manufacturing a paper-like article, as claimed in claim 1, said treating including the step of diluting at least one of said swelling agents with a non-swelling agent.

9. A method of manufacturing a paper-like article, as claimed in claim 1, said step of treating the film with a swelling agent including the step of heating it.

10. A method of manufacturing a paper-like article as claimed in claim 1, said film being a plasticized polyvinyl chloride film of 50μ in thickness, said first and said second stage comprising dipping with a first swelling agent comprising:

|  | Parts |
|---|---|
| Tetrahydrofuran | 95 |
| Methanol | 5 |

17° C., 6 seconds;
a second swelling agent comprising:

|  | Parts |
|---|---|
| Tetrahydrofuran | 5 |
| Methanol | 4 |

17° C., 3 seconds;
a third swelling agent comprising:

|  | Parts |
|---|---|
| Tetrahydrofuran | 3 |
| Methanol | 7 |

17° C., 5 seconds;
said coagulant being methanol, said third stage treatment being at 17° C., for 30 seconds.

11. A method of manufacturing a paper-like article as claimed in claim 1, said film being a high-pressure polyethylene film of 50μ in thickness first dipped in toluene kept at 90° C. for 2 seconds, then dipped in toluene kept at 50° C. for 5 seconds, further dipped in methanol for 30 seconds at 20° C., and thereafter air-dried.

12. A method of manufacturing a paper-like article as claimed in claim 1, further comprising the steps of interposing prior to the step of coagulating the step of pressing said swollen layer upon a matrix having a smooth surface to predetermine the shape of the surface of said film and thereafter peeling off said film.

13. A method of manufacturing a paper-like article as claimed in claim 1, further comprising the steps interposed prior to the step of coagulating, of pressing said swollen layer upon a three-dimensionally shaped matrix to impart the film a three-dimensional embossed surface.

14. A method of manufacturing a paper-like article as claimed in claim 1, further comprising the steps interposed during said step of coagulating of impressing a pattern upon said layer while semicoagulated.

15. A method of manufacturing a paper-like article as claimed in claim 1, at least one of said swelling and coagulating agents have admixed thereto additives selected from a group consisting of surface active agents, anti-static agents, foaming agents and coloring dyes.

16. A method of manufacturing a paper-like article as claimed in claim 1, said film being a polyethylene film, further including the step of subjecting the surface of said film to a corona discharge prior to the step of treating it with a swelling agent.

17. A method of manufacturing a paper-like article as claimed in claim 1, said film being a polyethylene film further including the step of subjecting the surface of said film to dichromatic oxidation prior to the step of treating it with a swellng agent.

18. A method of manufacturing a paper-like article as claimed in claim 1, further comprising prior to said first stage treatment the steps of preshaping said film into a flattened cylindrical shape, and after said step of drying the step of heat treating and trimming of the folded areas, whereby a flat sheet treated on one side only is obtained.

References Cited
UNITED STATES PATENTS

| | | | |
|---|---|---|---|
| 2,209,940 | 7/1940 | Smith | 117—47 |
| 2,662,033 | 12/1953 | Andrew | 117—47 |
| 2,790,727 | 4/1957 | Hilborn | 117—63 |
| 2,848,752 | 8/1958 | Bechtold | 117—36.7 |
| 2,993,805 | 7/1961 | Kay | 117—36.7 |
| 3,078,178 | 2/1963 | Ostberg | 117—64 |
| 3,100,721 | 8/1963 | Holden | 117—63 |
| 3,108,872 | 10/1963 | McMahon | 117—36.7 |
| 3,135,622 | 6/1964 | Ranalli | 117—63 |
| 3,208,875 | 9/1965 | Holden | 117—63 |
| 3,298,895 | 1/1967 | Plambeck | 117—36.7 |

MURRAY KATZ, Primary Examiner

U.S. Cl. X.R.

117—36.7, 47, 48, 63, 64

UNITED STATES PATENT OFFICE
CERTIFICATE OF CORRECTION

Patent No. 3,515,567        Dated June 2, 1970

Inventor(s) Kaneyasu Tani et al.

It is certified that error appears in the above-identified patent and that said Letters Patent are hereby corrected as shown below:

In the heading to the printed specification, after line 13, insert -- assignors to Nippon Kakoh Seishi K.K. --.

Signed and sealed this 12th day of September 1972.

(SEAL)
Attest:

EDWARD M. FLETCHER, JR.
Attesting Officer

ROBERT GOTTSCHALK
Commissioner of Patents